Figure 1:
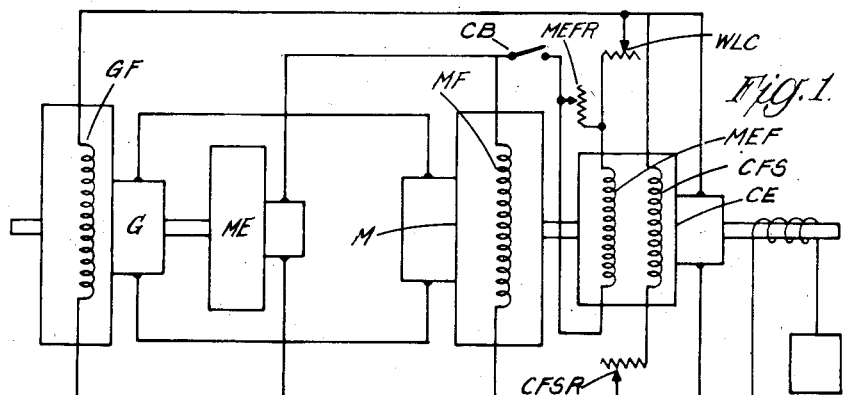

May 27, 1941.    H. FREEMAN    2,243,337
MOTOR CONTROL SYSTEM FOR ELECTRIC WINDING GEAR
Filed Sept. 30, 1937    3 Sheets-Sheet 1

INVENTOR:
HENRY FREEMAN
BY
ATTORNEY

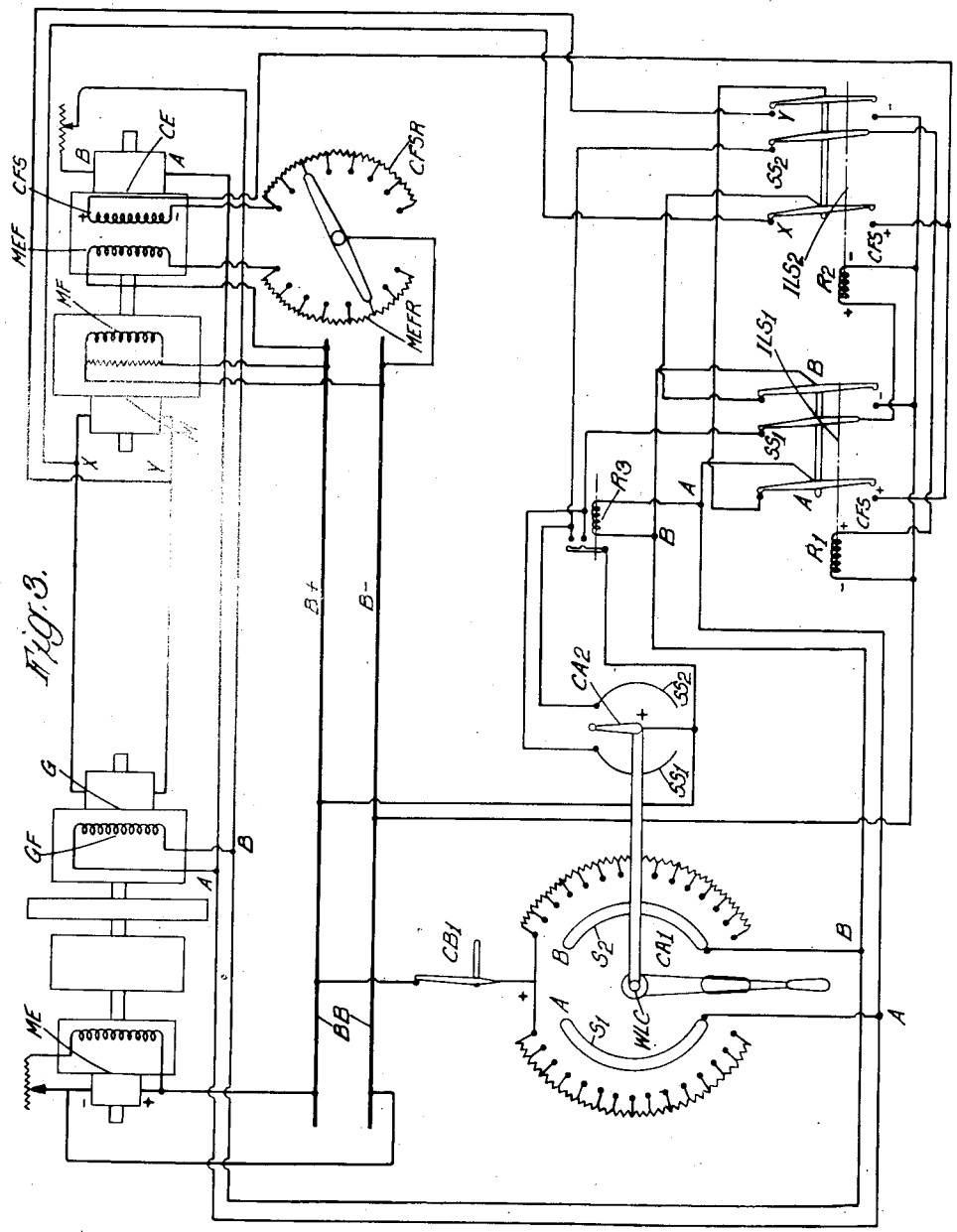

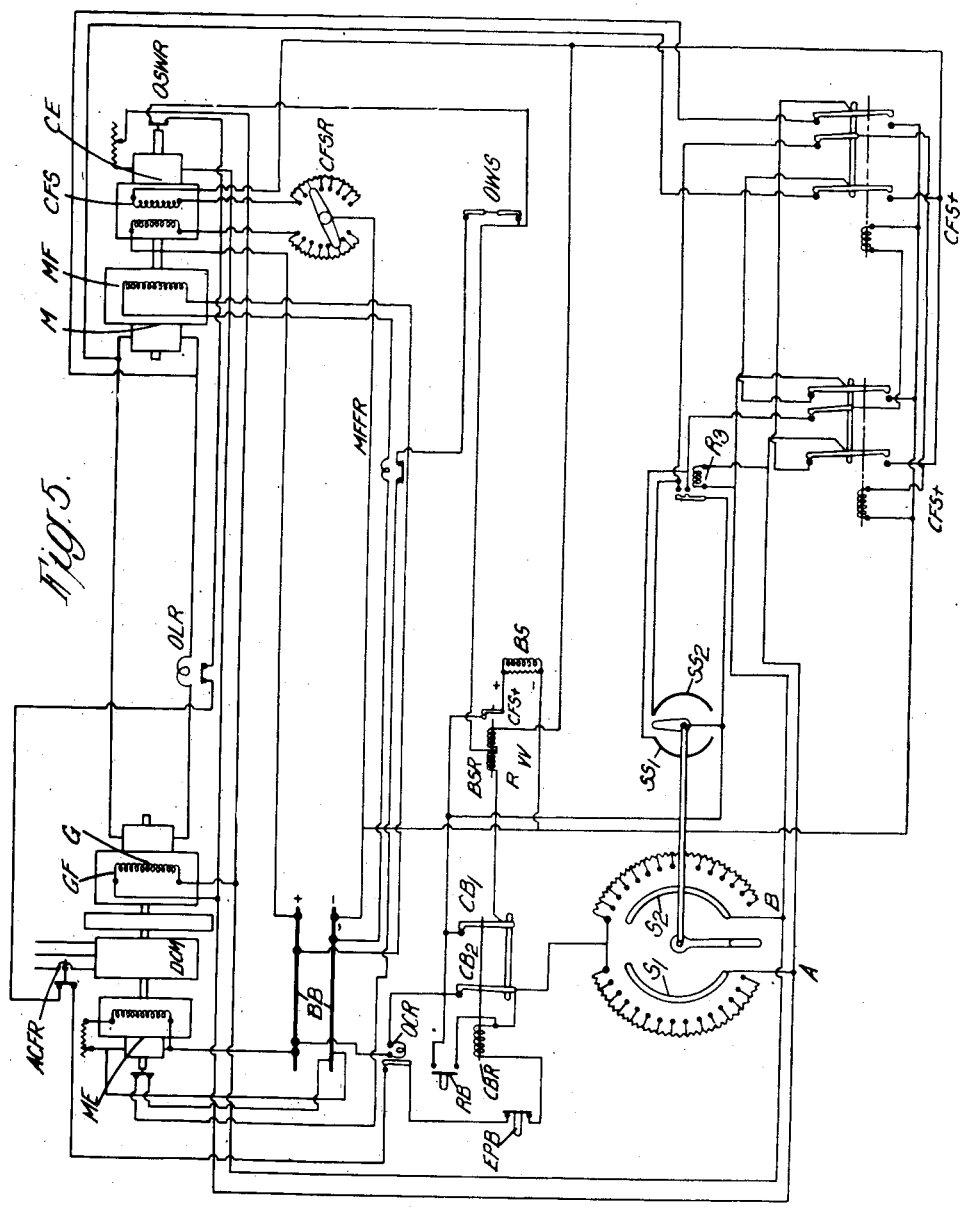

Patented May 27, 1941

2,243,337

UNITED STATES PATENT OFFICE 2,243,337

MOTOR CONTROL SYSTEM FOR ELECTRIC WINDING GEAR

Henry Freeman, Mysore State, Southern India, assignor of one-half to The Kolar Mines Power Station, Limited, London, England Application September 30, 1937, Serial No. 166,703
In Great Britain December 5, 1936

10 Claims. (Cl. 172—239)

This invention relates to electric winding gear for hoists and the like for mines, for example, and in particular to such gear of the kind known as Ward-Leonard, in which an exciter machine coupled mechanically to run at the same speed as a generator constituting a source of current for the winder motor, or which is separately driven at constant speed, supplies field excitation current to both said generator and said winder motor through a controller comprising a variable resistance, the arrangement being such that for every adjustment or setting of this controller there is a corresponding motor speed. Usually in winding gear of this kind provision, e. g. cams operated by depth indicator driving gear, is made for controlling acceleration and deceleration at the ends of the wind, so that it remains possible for the operator by injudicious operation of the controller outside the range of such acceleration and deceleration control to cause dangerously high regenerative currents during attempted too rapid deceleration and excessive generator output during attempted too rapid acceleration elsewhere than at the ends of the wind, in either case bringing about excessive torque in the winder gear and severely stressing the winding rope.

This invention has for an object to remove this lack of foolproofness and to exclude the risk of danger and damage by injudicious controller adjustment elsewhere than at the ends of the wind so that such injudicious adjustment or handling of the controller can have no ill effects.

According to the invention, a further exciter machine (hereinafter referred to as the control exciter) is coupled mechanically to run at a speed the same as, or proportional to, that of the winder motor and connected electrically so as to share with the normal (generator speed) exciter (hereinafter referred to as the main exciter) in the supply of field excitation current to the generator, this "control exciter" having two field windings one of which is connected in shunt with the output thereof and the other of which is connected with the output of the main exciter.

The winding which is connected to the output of the main exciter may be connected in series with the connection of said output with the generator field, in which case the shunt field winding of the control exciter (preferably including a variable resistance connected therewith in series) will be such that at full speed the control exciter output voltage, due to the field produced by this winding, is less than that of the main exciter, and the other winding, i. e. that which is connected with the output of the main exciter (preferably including a variable resistance connected in parallel therewith), will be such that the passage therethrough of the field excitation current of the generator field from the main exciter increases the field of the control exciter so that the output voltage of the latter is equal to that of the main exciter.

It has been found better, however, to connect that field winding of the control exciter which is connected with the output of the main exciter directly across the main exciter output. Thus, for example, one field winding (preferably with a variable resistance connected in series therewith) of the control exciter will be connected in shunt with the output of said exciter (and is hereinafter referred to for the sake of clearness as the "self-excited" field winding of the control exciter), and the other field winding of the control exciter (preferably with a variable resistance connected in series therewith) will be connected in shunt with the output of the main exciter (and is hereinafter referred to for the sake of clearness as the "separately excited" field winding of the control exciter).

Whichever way, however, that field winding of the control exciter which is connected with the output of the main exciter is connected with the latter, it will be seen that the fields produced by the two field windings of the control exciter will vary and can be varied by the variable resistances which are preferably provided, and in practice the control exciter will be so set or adjusted that the energization of the two field windings renders the output voltage of the control exciter the same as that of the main exciter when the winder is running at full speed. Thus, under full speed conditions, the control exciter output will in both the cases referred to be "floating" across the main exciter and the generator field and no current will flow in the control exciter output circuit. It will also be seen that the share taken by the control exciter with the main exciter in the supply of field excitation current to the generator will vary with different speed conditions, so that a large degree of automatic control is provided by the control exciter. It is found in practice that the second connection of what may be termed the main exciter field winding of the control exciter, i. e. directly across the main exciter output, enables a larger degree of control to be obtained, and therefore in the following description with reference to the drawings this arrangement will be dealt with more fully than the first-mentioned arrangement.

Figure 2:
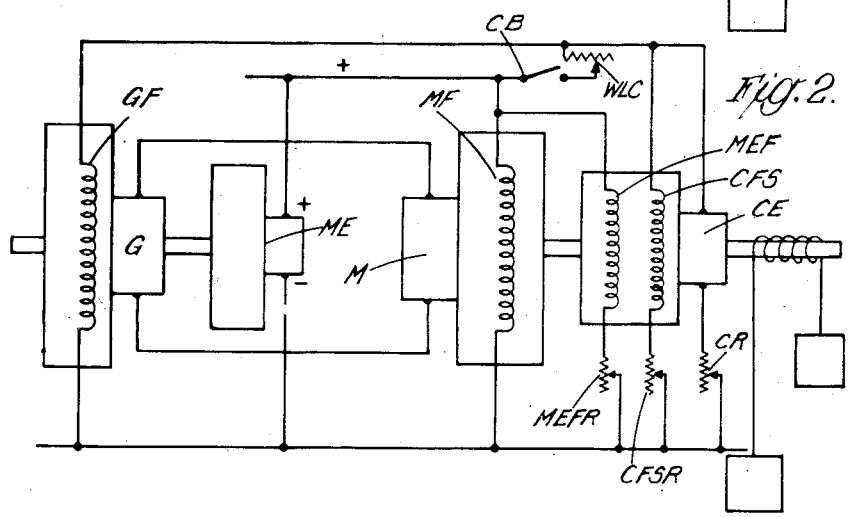
Figure 4:
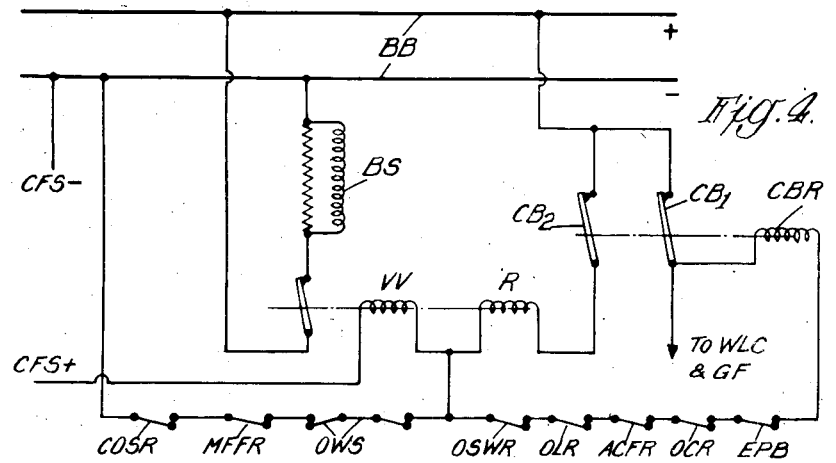

The accompanying drawings are schematic circuit diagrams, Figures 1 and 2 showing the fundamental apparatus and connections of two arrangements in which the separately excited field winding of the control exciter is connected in series and in shunt, respectively, with the generator field winding, Figure 3 showing the apparatus and connections for obtaining a reverse drive and the establishment of suicide connections (generator field connected across generator output) in the case of the arrangement of Figure 2, Figure 4 showing how safety devices are connected, and Figure 5 being in effect a combination of Figures 3 and 4. In all the figures the same references are used to indicate the same parts, certain letters (e. g. A, B and X, Y) being used to denote interconnected points as will be clear from a consideration thereof.

As shown in both these figures, the usual generator G with field winding GF has rotatable with the rotor thereof that of a main exciter ME and the winder motor, indicated at M, with a field winding MF has rotatable with its rotor that of a control exciter CE. In each case, one field winding CFS is connected in shunt with the output of the control exciter CE and also in both cases this shunt winding CFS has connected in series therewith a variable resistance CFSR. In the case of Figure 2 a further variable resistance CR is connected in series with the output of the control exciter CE. In both cases, also, the output of the generator G is connected as shown by broken lines with the input of the motor M and the output of the control exciter CE is connected across the generator field GF.

In the case of Figure 1 the output of the main exciter ME is connected directly across the field winding MF of the winder motor M and through a circuit breaker CB, through what may be termed the "main exciter" field winding MEF of the control exciter CE and through the Ward-Leonard controller WLC with the generator field GF (and therefore with the shunt field winding CFS and the output of the control exciter CE) a variable resistance MEFR being connected across the field winding MEF of the control exciter CE. As mentioned above, the output of the control exciter CE is under normal full speed conditions floating across the generator field GF. It will be seen, however, that when the winder, and therefore the motor M and the control exciter CE, is at rest, the control exciter CE constitutes a low resistance across the relatively high resistance of the generator field winding GF so that upon the controller WLC being set, as in starting the winder, to any given position the current from the main exciter ME will be divided proportionately between the generator field GF and the control exciter CE and thus the voltage developed across the generator field GF will increase progressively until the winder motor M and therefore the control exciter CE are running at a speed corresponding with the particular controller setting. Thus, in the case of Figure 1, the rate of acceleration is determined by the characteristics of the control exciter CE which, by means of the variable resistances CFSR and MEFR can be adjusted within limits as desired. Flow of excessive current from the main exciter ME through the control exciter CE and the generator field GF in the event of the controller WLC being set injudiciously at any time during the acceleration period to a higher speed position such as would cause excessive acceleration is prevented by the circuit breaker CB which is set to open upon the passage of current slightly greater in value than the full excitation current of the generator field winding GF. Only a small proportion (according to the difference in resistance of the control exciter CE and the generator field GF) of such excessive current flowing from the main exciter ME would pass through the generator field GF and therefore the generator output could not be high enough to be dangerous.

It will also be seen that if when the winder is running at full speed the controller WLC be set back (for example, to a lower speed position) the generator field cannot decrease accordingly, but will, on the contrary, be maintained by the output from the control exciter CE although at a somewhat lower voltage, because the excitation of the control exciter CE has been reduced in the field winding MEF thereof from the main exciter to the generator field by the insertion of resistance in this circuit in the controller WLC, and this field will decrease only with the decrease of the winder (and therefore control exciter) speed until the control exciter output voltage has fallen to that of the main exciter for the new controller position. It is to be understood that if, while the winder is running at full speed, the controller be set suddenly to the off position or open-circuited the current in the field winding MEF of the control exciter CE will be cut off, but the generator field winding GF will continue to receive current from the control exciter at a lower voltage than that of the main exciter due to the energization of the field winding CFS alone of the control exciter CE. Thus the output of the generator G will be reduced and the winder motor M will slow down and the control exciter with it, so that the control exciter output and therefore the generator field will decrease and the speed of the winder will be reduced smoothly and progressively until the usual mechanical brakes can be applied to bring it to rest.

Referring now once more to Figure 2 of the drawings in this case, and as above mentioned, the shunt field winding CFS of the control exciter CE will be referred to for the sake of clearness as the self-excited field winding, the other, or main exciter, field winding, indicated at MEF of the control exciter being referred to as a separately excited winding. This separately excited winding MEF, with a variable resistance MEFR connected in series therewith, is connected directly across the output of the main exciter ME which latter in turn is connected through the usual controller WLC across the generator field winding GF (and therefore across the self-excited winding CFS and the output of the control exciter CE). The motor field winding MF is also connected directly across the output of the main exciter.

In practice, in the case of Figure 2, the control exciter is so adjusted that at full winder speed the output voltage thereof is the same as that of the main exciter so that, as above mentioned, the control exciter output "floats" across the main exciter output and the generator field. If now for any reason the controller WLC be shifted to a position corresponding to a lower winder speed the energization of the generator field GF cannot fall suddenly to the value corresponding to the new controller setting because the voltage across the generator field GF will be maintained by the control exciter CE, the output voltage of which latter falls slightly because the current is now being supplied by its output to the generator field GF thus initiating deceleration. Deceleration of the winder will of necessity, therefore, take place smoothly and progressively until a speed is reached which corresponds to the new setting of the controller. Setting of the controller WLC to the off or open circuit position cuts off the main exciter ME from the generator field winding GF, which latter is thus energized by the control exciter CE alone, and if the control exciter CE energized the generator field GF at the same voltage as that of the main exciter ME there would be no reduction in the current flowing through the generator field GF, and consequently no reduction in the speed of the winder; but the voltage of the output of the control exciter CE is the same as that of the main exciter ME only when there is no current flowing in the control exciter output, and thus, immediately current is taken from the control exciter CE, the voltage thereof drops because of the resistance of the control exciter output and another resistance CR in series therewith and the current in the generator field GF is correspondingly reduced. This causes the winder motor M to regenerate and this brings about a slowing down of the winder and with it of the control exciter CE, the voltage of which latter consequently falls further and thus further reduces the generator field current, and so on.

The whole process is progressive and the speed of the winder is reduced smoothly to a point where mechanical brakes (not shown) can be applied readily to bring the winder to rest. The greater the value of the resistance CR connected in series with the control exciter output the greater will be the rate of deceleration produced as above explained, for such increase of resistance will increase the fall of voltage across the generator field GF due to the flow of current through such resistance CR and through the control exciter output, and the regenerative current produced by the winder motor M will be correspondingly greater. Thus, by varying the resistance CR of the control exciter output circuit any desired rate of deceleration may be obtained.

In order to ensure that the deceleration produced shall be smooth, constant and free from jerks, it is necessary that the regeneration current of the winder motor M shall remain substantially constant throughout the regeneration period and in order that this shall be so the voltage produced by the main generator G must decrease at a substantially constant rate. It does not follow, however, that current in the generator field GF must also decline at a constant rate, for the degree of magnetic saturation in the field system of the generator G as well as any variation in speed of the latter during the deceleration of the winder must be taken into account. For example, in the case of a generator with only a small degree of saturation and which is driven at constant speed without a flywheel and slip regulator it will be necessary for the field current to decline at a substantially constant rate, but the curve showing field current plotted against deceleration time in the case of a generator having a high degree of saturation driven by a motor having a flywheel and slip regulator will have a pronounced droop or sag below a straight line joining its ends. It will be seen that any such requirement may be met by varying the ratio of self to separate excitation of the control exciter according to the invention.

It will be seen that these resistances may be used to cause the control exciter CE to be entirely self-excited or entirely separately excited; or again, for example, to cause the total field of the control exciter CE to be 40 per cent. separately excited and 60 per cent. self-excited. Thus, the curve of output current plotted against speed of rotation for this machine when its output is connected to a constant resistance may be varied or selected as desired and will be a straight line when the excitation is entirely separate and a curve of maximum curvature when the field is entirely self excited.

Turning now to acceleration; when the winder is at rest there is no voltage at the output of the control exciter CE which thus constitutes a low resistance across the generator field GF. When the controller WLC is set to a given position the current from the main exciter ME flows in part through the generator field GF and in part through the control exciter CE (output), and, as the speed of the winder motor M increases the effective resistance of the control exciter CE increases (owing to the back E. M. F. generated therein) and thus the voltage across the generator field GF and the current flowing through the latter increase, until when the winder motor M has reached a speed corresponding with the controller setting a state of equilibrium will obtain between the main exciter ME and the control exciter CE. It will be noted that for every speed of the winder motor M there is a corresponding effective or apparent resistance of the control exciter CE. The accelerating current supplied by the generator G to the winder motor M depends upon the rate of increase of current in the generator field GF and this current is inversely proportional to that in the control exciter CE, the ratio being dependent upon the resistance of the generator field GF and the effective resistance of the control exciter CE at any given instant. It would be possible therefore to shift the controller WLC too far in the forward or accelerating direction for safety in view of the low apparent resistance of the control exciter CE. This is avoided by the inclusion in the connections from the main exciter ME to the control exciter CE of a circuit breaker CB set to open at any desired current and so limit effectively the maximum current flow from the main exciter ME. This arrangement has a great advantage over the usual connection of trip devices in the armature circuits of the generator and winder motor, because with such usual arrangements the circuit is not broken until the actual overload current flows, possibly causing damage to the commutators and brush gear of the machines in question and heaving stressing or jerking of the winder rope, whereas, in the new arrangement, by the time the current in the control exciter CE has reached the permitted limit and operated the circuit breaker the current in the generator field GF will still be at a less value owing to the inductive lag of the latter. Thus the main accelerating current will still be at a safe value when cut off.

It will be seen that the higher the effective resistance of the control exciter CE when stationary the larger is the proportion of the current from the main exciter ME that is allowed to flow through the generator field GF, and the greater is this proportion the greater will be the accelerating current and the less the acceleration time and also as described above the less the decelerating time. In this way the rate of both acceleration and deceleration can be controlled by varying the resistance of the output or armature circuit of the control exciter CE by means of the resistance CR. This resistance CR may, if desired, be variable automatically, by means (not shown) worked from the usual depth indicator, in order to compensate for the variations in torque conditions between the beginning and end of a wind.

In normal Ward-Leonard installations, in order to reverse the direction of rotation of the winder, it is necessary to provide for the reversal of the connections from the main exciter to the generator field. In an arrangement according to the invention, it is necessary for the connections of the generator field GF and of the control exciter armature to be made reversible together as one unit, the polarity of the control exciter output being automatically reversed by its now being driven in the reverse direction by the winder motor.

Further, in the event of the Ward-Leonard controller being shifted to neutral or of braking being initiated by the occurrence of emergency conditions it is essential that the connections of the generator field and the control exciter remain as they were when such conditions arose. It is, moreover, necessary that "suicide" contacts shall not connect the generator field and the control exciter output "unit" across the main generator output until the winder speed has fallen to a predetermined value. Figure 3 shows the circuit connections of an arrangement for meeting these requirements in the case of an installation according to Figure 2. The output of the control exciter CE and the generator field GF are connected—(A) and (B)—in parallel with one another and with two sectors S1 and S2, respectively, of the controller WLC and also with corresponding points in one section ILS1 of interlock switch gear ILS1, ILS2. The controller WLC has movable as one with the main contact arm CA1 thereof a second contact arm CA2 for cooperation, as the controller is adjusted, with one or the other of two sectors SS1 and SS2, respectively. The main exciter ME is of constant voltage type and its output is connected with positive and negative busbars BB and thence with the separately excited field winding MEF of the control exciter CE. The positive busbar BB is connected through the contact breaker CB1 with the adjacent ends of the usual resistance elements of the controller WLC. The contact arm CA2 is connected with the positive busbar BB and the negative busbar BB is connected with appropriate points in the interlock switch gear ILS1, ILS2. The two sectors SS1 and SS2 are connected with appropriate points in the interlock switch gear ILS1 and ILS2. The input terminals of the winder motor M and therefore the output terminals of the generator G are connected with points in the section ILS2. Further, the positive end of the field winding CFS of the control exciter CE is connected with corresponding points in the interlock switch gear ILS1, ILS2. The controller WLC and both sections ILS1, ILS2 of the interlock switch gear are shown in their neutral or off positions which the latter tend to assume under the influence of gravity or springs.

If now, the contact arm CA1 of the controller WLC be shifted to connect the positive busbar BB with the sector S1, this will connect corresponding poles (A) of both the generator field GF and the control exciter output in the positive busbar BB. The sector SS2 also will be connected with the positive busbar BB and in addition said sector SS2 will be connected through the single pole switch of the section ILS2 through a relay winding R1 with the negative busbar BB. The consequent energization of the winding R1 shifts the section ILS1 to the "on" position and this latter then effects the necessary connection of the other poles (B) of the generator field GF and the control exciter output with the negative busbar BB. Similarly, shifting the contact arm CA1 of the controller WLC to connect the sector S2 thereof with the positive busbar BB will connect the last-mentioned poles (B) of the generator field GF and control exciter output with the positive busbar BB; and the contact arm CA2, now connecting the sector SS1 with the positive busbar BB, connects the latter through the single pole switch of the section ILS1 and through a relay winding R2 to the negative busbar BB. The energization of this winding shifts the section ILS2 to the "on" position, and as a result the other poles (A) of the generator field GF and the control exciter output are connected with the negative busbar BB.

It will be noted that the winding of a relay R3 is connected in parallel with the generator field GF and control exciter output. This relay R3 therefore is operative whenever the voltage of the control exciter CE exceeds a predetermined value, and when it is operative it maintains both sectors SS2 connected with the positive busbar BB, irrespective of whether the controller WLC be set to neutral or not. The relay R3 does not, however, maintain both the relay windings R1 and R2 energized because, as above explained, before the relay R3 is operative one or other of the sections ILS1, ILS2 has been shifted to the "on" position, thus interrupting the connection of one or other of said relays R1, R2 with the corresponding sector SS1 or SS2 as the case may be, and with the positive moving contact of the relay R3. It will be understood that all the contact arms of each interlock switch gear section move as one.

Now assuming that the winder is running in one direction or the other according as the contact arm CA1 is connecting the sector S1 or S2 with the positive busbar BB and that said contact arm CA1 is moved to the neutral position shown, and taking, for the sake of simplicity of description, the case of the contact arm CA1 having previously been connecting the sector S1 with said positive busbar BB, so that the relay R1 brought the section ILS1 to the "on" position, said relay R1 will continue to be energized and to maintain the section ILS1 in the "on" position because the relay R3 will remain closed until the voltage of the control exciter output (which is proportional to winder speed) has fallen to a predetermined value, when the relay R3 will open, thus de-energizing the relay R1, and, the interlock switch gear section ILS1 will return to the off position, when it will be seen the output of the generator G is connected ("suicide" connections) across the generator field GF and control exciter output in the appropriate manner. It will be apparent that, irrespective of the necessary reversal of the connections of the control exciter output and generator field GF, the positive end of the field winding CFS of the control exciter must nevertheless always be connected with whichever pole (A) or (B) of the control exciter output and generator field GF are at any time positive. It will be seen that when the sections ILS1 and ILS2 occupy their "off" positions this end of the winding CFS is disconnected and that when either of the sections ILS1, ILS2 is shifted to the "on" position this end of the winding CFS will be connected with whichever of the sectors S1, S2 of the controller WLC is then connected with the positive busbar BB.

As will be apparent, Figures 1 and 2 and the description thereof make clear the functioning of the fundamentals of the invention in two different examples but they do not go further than explaining the working of the invention for the winder to run in one direction only. It will be noted also that the above description with reference to Figure 3 explains how an arrangement according to Figure 2 is made to work in both directions and how provision is made for the usual "suicide" connections and the necessary interlocking switch gear so that regenerative braking will take place smoothly and progressively until the speed in either direction is reduced substantially. It is now necessary to explain how the usual brake solenoid, the de-energization of which allows the mechanical brakes to be applied, is de-energized when the speed has been reduced by regenerative braking and also how emergency conditions result automatically in braking regeneratively where possible and mechanically only where the emergency condition is such that regenerative braking cannot be used. Referring now to Figures 4 and 5 a relay BSR controls the energization of a brake solenoid BS from the positive and negative busbars BB. This relay BSR has two windings, energization of either of which tends to keep it closed. The joined ends of these windings are negative and are connected through various devices, hereinafter set forth, for initiating non-regenerative braking, to the negative busbar BB because, in order to initiate non-regenerative braking, it is required that both windings of the relay BSR shall be de-energized. One winding VVR of the relay BSR is connected at its other end with the positive end of the field winding CFS of the control exciter CE so that this winding is actually connected across the output of the control exciter CE and the energization thereof will vary with the voltage of the output of the control exciter CE in precisely the same way as in the case of the relay R3. The other winding R of the relay BSR is connected through a contact breaker CB2, associated with the above-mentioned contact breaker CB1 to open and close therewith, with the positive busbar BB. This double contact breaker CB1, CB2 is controlled by a winding CBR connected in series with a number of devices, hereinafter set forth, for initiating regenerative braking under different circumstances across the winding R of the relay BSR. Now, whenever braking takes place, i. e. in all cases of braking, the generator field GF must be disconnected from the main exciter ME and this is effected by the de-energization of the winding CBR which results in the opening of the double contact breaker CB1, CB2. It will be noted that all the emergency devices are effectively in series with the windings of the relay CBR. For non-regenerative braking both windings VV and R of the relay BSR must be de-energized to release the brake solenoid BS, and therefore the over-wind switch OWS, the motor field failure relay MFFR and the converter set overspeed relay COSR are connected in the common negative lead to both windings of the relay BSR. For regenerative braking the winding R of the relay BSR must be de-energized and the other winding thereof (which is connected across the field winding CFS of the control exciter CE and therefore across the output of the latter) must remain connected to maintain the relay BSR closed until the voltage of the control exciter CE and thus the speed of the winder has fallen to a value appropriate for mechanical braking. This winding R of the relay BSR is de-energized by the opening of the contact breaker CB2 (simultaneously with the opening of the contact breaker CB1) which opening is effected by the de-energization of the winding CBR by the operation of the emergency push button EPB, of the over current relay OCR the winding of which is connected in the lead to the generator field GF from the main exciter ME, of the alternating current failure relay ACFR the winding of which is connected in the supply leads to an A. C. motor ACM (see Figure 5) driving the generator G and the main exciter ME, of the overload relay OLR the winding of which is connected in the leads between the output of the generator G and the input of the winder motor M, or of the overspeed winder relay OSWR which latter operates as will be apparent when the winder is running at an excessive speed. Each of the devices OWS, MFFR, COSR which initiate non-regenerative braking, and each of the devices EPR, OCR, ACFR, OLR and OSWR which initiate regenerative braking under emergency conditions are shown in Figure 4 only so far as the circuit interruptions effected thereby are concerned, but they are shown more fully and in their appropriate main circuit positions in Figure 5 which shows both the circuits of Figure 3 and the circuits of Figure 4 interrelated as in a complete installation.

It will be seen that the winding CBR the energization of which maintains the double contact breaker CB1, CB2 closed is energized actually through the contact breaker CB1 and that upon the de-energization of this winding CBR and consequent opening of the contact breakers CB1 the winding CBR is cut off from the positive busbar BB. In order to enable re-energization of this winding CBR for re-setting the contact breaker CB1, CB2 to the closed position by connecting the winding CBR temporarily with the positive busbar independently of the contact breaker CB1 a re-setting push button RB (see Figure 5) is provided, the operation of which short-circuits the contact breaker CB1.

The connections of a complete installation based on an arrangement the fundamentals of which are as described with reference to Figure 1 will be apparent to those skilled in the art.

The action of an installation according to the invention is the same in effect as that of the cams already employed at the termination and commencement of wind, but is operative quite independently of the position of the cage or other load, and, moreover, the controller lever may be adjusted rapidly and to any extent without ill effect.

What I claim is:
1. Electric winding gear comprising a motor, a generator supplying current to said motor and having a field winding, a main exciter, control means including a variable resistance, said main exciter supplying field excitation current to said motor and through said control means to said field winding, and a control exciter coupled to said motor and adapted to run at a speed proportional thereto, said control exciter being connected electrically to said field winding, said control exciter and said main exciter cooperating in supplying current to said generator field winding, said control exciter having two field windings, one of which is connected with the output thereof and the other of which is connected with the output of said main exciter.

2. Electric winding gear comprising a motor, a generator supplying current to said motor and having a field winding, a main exciter, control means including a variable resistance, said main exciter supplying field excitation current to said motor and through said control means current to said generator field winding, and a control exciter coupled to said motor and adapted to run at a speed proportional thereto, said control exciter being connected electrically to said field winding, said control exciter and said main exciter cooperating in supplying current to said generator field winding, said control exciter having two field windings, one of which is connected in shunt with the output thereof and the other of which is connected with the output of said main exciter.

3. Electric winding gear comprising a motor, a generator constituting a source of current for said motor, said generator provided with a field winding, a main exciter, a controller including a variable resistance, said main exciter supplying field excitation current to said motor and through said controller current to said generator field winding, and a control exciter coupled mechanically to run at a speed proportional to that of said motor and connected electrically to said field winding, said control exciter and said main exciter cooperating in supplying current to said generator field winding, said control exciter having two field windings, one of which is connected in shunt with the output thereof and through the other of which the output of said main exciter is connected to said generator field.

4. Electric winding gear according to claim 1, wherein a variable resistance is connected with at least one of the field windings of said control exciter, whereby the energization of said exciter due to such winding may be varied.

5. Electric winding gear according to claim 1, wherein a variable resistance unit is connected in series with the output of said control exciter whereby the effective resistance thereof may be varied.

6. Electric winding gear according to claim 1, wherein said control exciter has under full speed conditions an output voltage substantially equal to that of said main exciter, whereby the control exciter output floats across said main exciter and said generator field with no current flowing therein.

7. Electric winding gear according to claim 1, including means for disconnecting said generator field from said main exciter during emergency breaking.

8. Electric winding gear according to claim 1, including means for maintaining the connections of said generator field, the output of said control exciter and the self-excited winding of the latter during regenerative braking the same as they were when regenerative braking commenced until said control exciter output and, therefore, the speed of said motor has fallen to a predetermined value.

9. Electric winding gear comprising a motor, a generator constituting a source of current for said motor, a main exciter, a settable controller including a variable resistance, said main exciter supplying field excitation current to said motor and through said controller to said generator, a control exciter coupled mechanically to run at a speed proportional to that of said motor and connected electrically to share with said main exciter in the supply of field excitation current to said generator, said control exciter having two field windings one of which is connected in shunt with the output thereof and the other of which is connected with the output of said main exciter, and switch gear comprising two interlocking sections and two relay windings, respectively, each of said sections being shiftable automatically to a predetermined position by the shifting of said controller through energization of one of said relay windings, a relay connected to close the circuit of both said relay windings through the setting of the controller, and each of the two interlocking sections of the switch gear having contacts which are opened when the corresponding one of said sections is shifted upon setting of the controller, said contacts of each of said sections when open breaking the circuit of the corresponding one of said relay windings, said relay being connected for operation thereof across the output of the control exciter.

10. Electric winding gear comprising a motor, a generator constituting a source of current for said motor, a main exciter, a settable controller including a variable resistance, said main exciter supplying field excitation current to said motor and through said controller to said generator, a control exciter coupled mechanically to run at a speed proportional to that of said motor and connected electrically to share with said main exciter in the supply of field excitation current to said generator, said control exciter having two field windings one of which is connected in shunt with the output thereof and the other of which is connected with the output of said main exciter, and switch gear comprising two interlocking sections and two relay windings, respectively, each of said sections being shiftable automatically to a predetermined position by the shifting of said controller through energization of one of said relay windings, one interlocking section of the switch gear having contacts connected with the output of the generator, the other interlocking section of the switch gear having contacts connected with the output of the control exciter which latter in turn is connected in parallel with the generator field, both said interlocking sections having contacts connected with one end of the self-excited field winding of the control exciter, the other end of said field winding being connected permanently with one pole of the main exciter; the generator field winding being connected across the generator output and the first mentioned end of the self-excited field winding of the control exciter being disconnected when neither of the interlocking sections of the switch gear is shifted, whilst the generator field winding is disconnected from the generator output and said first mentioned end of the self-excited field winding of the control exciter is connected appropriately with the output of the control exciter when either of said interlocking sections is shifted.

HENRY FREEMAN.